(12) United States Patent
Stevens et al.

(10) Patent No.: US 6,736,547 B2
(45) Date of Patent: May 18, 2004

(54) EXPANDED-BEAM, BUTT-COUPLED OPTICAL CONNECTOR

(75) Inventors: Rick C. Stevens, Apple Valley, MN (US); Kevin J. Thorson, Eagan, MN (US)

(73) Assignee: Lockheed Martin Corporation, Bethesda, MD (US)

( * ) Notice: Subject to any disclaimer, the term of this patent is extended or adjusted under 35 U.S.C. 154(b) by 0 days.

(21) Appl. No.: 09/832,268

(22) Filed: Apr. 10, 2001

(65) Prior Publication Data

US 2002/0146211 A1 Oct. 10, 2002

(51) Int. Cl.[7] ................................................. G02B 6/38
(52) U.S. Cl. .............................. 385/61; 385/55; 385/58
(58) Field of Search .............................. 385/61, 55, 60, 385/66, 72, 73, 74, 15, 27, 28

(56) References Cited

U.S. PATENT DOCUMENTS

| | | | | |
|---|---|---|---|---|
| 4,730,891 A | * | 3/1988 | Poorman | 385/74 |
| 5,097,524 A | * | 3/1992 | Wasserman et al. | 385/73 |
| 5,212,745 A | * | 5/1993 | Miller | 385/25 |
| 5,212,749 A | * | 5/1993 | Huggins et al. | 385/62 |
| 5,588,077 A | * | 12/1996 | Woodside | 385/16 |
| 5,673,347 A | * | 9/1997 | Pitassi | 385/70 |
| 5,796,894 A | * | 8/1998 | Csipkes et al. | 385/38 |
| 5,870,511 A | * | 2/1999 | Sawatari et al. | 385/12 |
| 6,343,166 B1 | * | 1/2002 | Hellman et al. | 385/31 |
| 6,496,623 B2 | * | 12/2002 | Asakura et al. | 385/47 |
| 2002/0110304 A1 | * | 8/2002 | Werkheiser et al. | 385/8 |
| 2003/0063864 A1 | * | 4/2003 | Qin et al. | 385/74 |

* cited by examiner

*Primary Examiner*—Chandrika Prasad
(74) *Attorney, Agent, or Firm*—Patrick M. Hogan; Kevin W. Cyr

(57) ABSTRACT

An optical connector provides the reliability of a butt-coupled connection with the mating simplicity of an expanded-beam coupling arrangement. In an example embodiment, an optical fiber connector arrangement includes a first ferrule having an expanded-beam arrangement disposed therein. The expanded-beam arrangement within the first ferrule includes a first lens that is coupled to a first optical fiber and a second lens that is coupled to a second optical fiber, wherein the second optical fiber protrudes from the first ferrule. The connector arrangement further includes a second ferrule arranged to receive the first ferrule. The second ferrule supports a third optical fiber and is shaped to receive the first ferrule. The second optical fiber is butt-coupled to the third optical fiber within the second ferrule when the second ferrule is engaged with the first ferrule.

19 Claims, 3 Drawing Sheets

EXPANDED-BEAM, BUTT-COUPLED OPTICAL CONNECTOR

FIELD OF THE INVENTION

The present invention generally relates to optical fiber connector assemblies. More particularly, the invention relates to an optical fiber connection arrangement that improves reliability and optical performance while reducing maintenance and manufacturing costs.

BACKGROUND

The speed and bandwidth of data transmission over fiber optic cable render optical fiber communication particularly advantageous for certain applications. Fiber optic connector assemblies typically include mating ferrules and housings, which hold the fiber in a rigid or semi-rigid mounting within a fiber passage. The core of the optical fiber carries the optically encoded information, and one section of the fiber optic core held in one ferrule and another section of the fiber optic core is held in another ferrule. Perfect concentricity of the mating fiber cores permits maximum light transmission over the interconnection while misalignment of the mating fiber cores either increases insertion loss or disrupts transmission altogether.

Expanded-beam optical coupling is one approach to coupling one optical fiber to another. Expanded-beam coupling uses a set of self-focusing lenses to focus the optical beam between two connecting fibers. The opposing fiber optic cables are each terminated with one self-focusing lens and are rigidly mounted within the ferrules, each lens being adjacent to the mating surface of the ferrule. Once the ferrules are physically mated, the lens/lens combination provides the optical coupling between the fiber cables. This approach has the disadvantage of necessitating a rigid interlocking arrangement between the ferrule housings in order to ensure fiber core concentricity.

In another approach, a butt-coupled connection abuts one fiber core to the other fiber within the ferrules are coupled by. In this approach, one ferrule has a protruding fiber core, or "pigtail", that moves within the ferrule to accommodate the mating and unmating of the ferrules. A spring is included behind the pigtail to exert a force on the fiber in order to maintain the butt coupling between the fibers during environmental shock and vibration. Unfortunately, the pigtail with the spring-enabled movement complicates module design and manufacturing assembly.

There is a need for a robust fiber optic connector arrangement that maintains fiber core alignment and simplifies optical coupling between two fiber cables. An arrangement and a system that addresses the aforementioned problems, as well as other related problems, are therefore desirable.

SUMMARY OF THE INVENTION

In various embodiments, the invention provides an optical fiber connector arrangement that includes a first ferrule having an expanded-beam coupling arrangement disposed therein. The expanded-beam arrangement within the first ferrule includes a first lens that is coupled to a first optical fiber and a second lens that is coupled to a second optical fiber, wherein the second optical fiber protrudes from the first ferrule. The connector arrangement further includes a second ferrule arranged to receive the first ferrule. The second ferrule supports a third optical fiber and is shaped to receive a portion of the first ferrule. The second optical fiber is butt-coupled to the third optical fiber within the second ferrule when the second ferrule is engaged with the first ferrule.

It will be appreciated that various other embodiments are set forth in the Detailed Description and Claims that follow.

BRIEF DESCRIPTION OF THE DRAWINGS

Various aspects and advantages of the invention will become apparent upon review of the following detailed description and upon reference to the drawings in which.

DETAILED DESCRIPTION

Figure 1A:
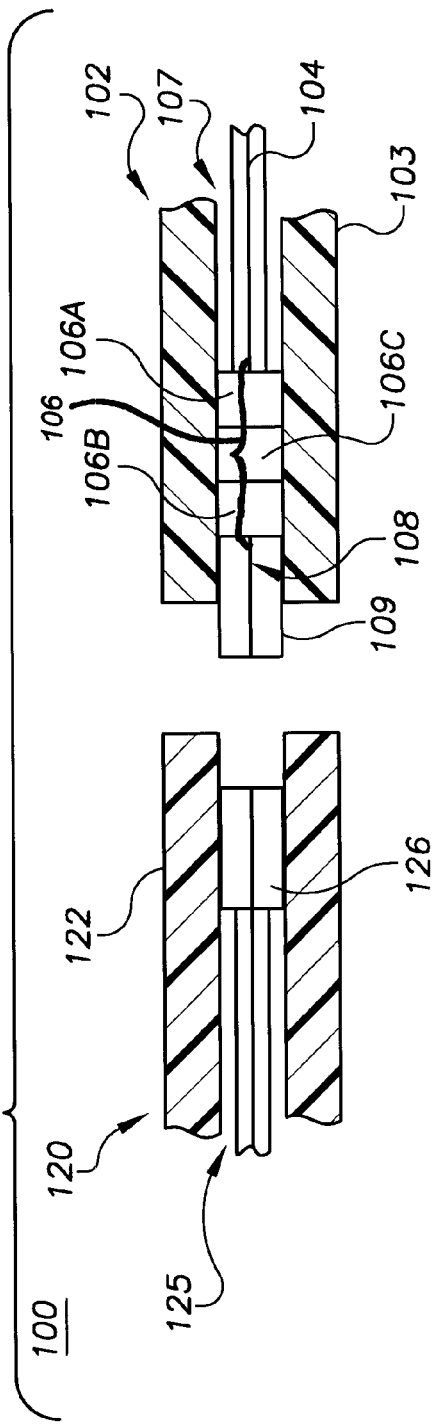
FIG. 1A is a diagram of an unmated optical fiber connector arrangement made in accordance with an embodiment of the present invention.
Figure 1B:
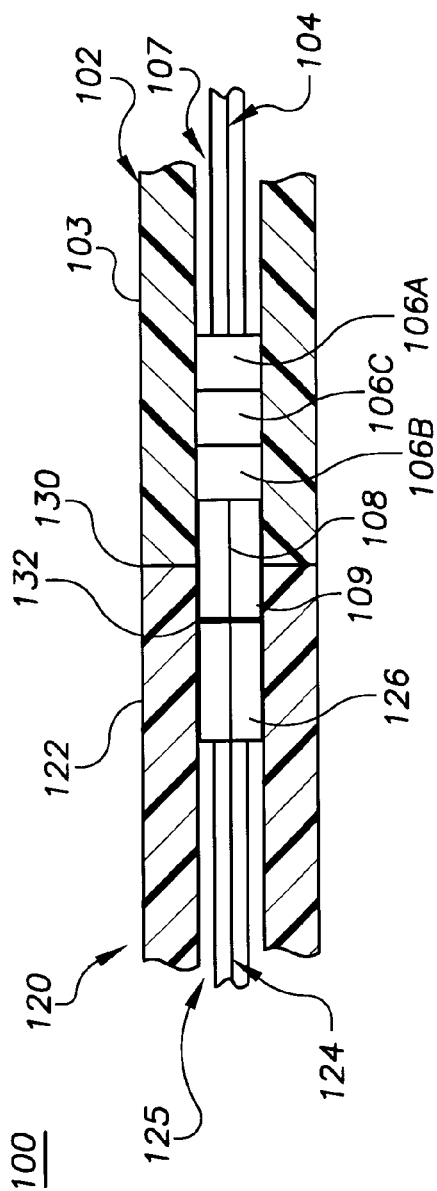
FIG. 1B is a diagram of a mated optical fiber connector arrangement made in accordance with an embodiment of the present invention.

FIGS. 1A and 1B are simplified cross-sectional views of an unmated and a mated optical fiber connector arrangement 100 made in accordance with an example embodiment of the invention. The cross-sectional views are intended to illustrate, in simplified form, a combined arrangement that includes both butt-coupling and expanded beam arrangements. The shapes and materials that characterize the various elements encompass innumerable variations, which depend on application requirements. Connector arrangement 100 includes ferrule 102 that mates with ferrule 120 for optically coupling optical fiber 104 to optical fiber 124. Ferrule 102 includes an expanded-beam coupling 106 arrangement that is disposed within passage 107 of a housing member 103 of the ferrule. The expanded-beam arrangement includes a first lens 106A coupled to optical fiber 104 and a second lens 106B coupled to an optical fiber 108. In the expanded-beam coupling arrangement, lens 106A receives a light beam from optical fiber 104 disposed within ferrule 102 and expands the beam to a larger diameter. The expanded-beam travels within an air gap 106C and is received by lens 106B, which is similarly configured. Lens 106B receives the expanded-beam and refocuses it to optical fiber 108 held within housing member 103. Optical fiber 108 is encased in a terminus 109 that partially protrudes from housing member 103.

Ferrule 120 is arranged and shaped to receive ferrule 102. Ferrule 120 includes a housing member 122 that supports optical fiber 124 within a passage 125. Optical fiber 124 is supported and encased within a terminus element 126 that is recessed within housing member 122. In this example, terminus 126 is rigidly mounted within ferrule 120.

Referring to FIG. 1B, as ferrules 102 and 120 are mated, terminus 109 of ferrule 102 is inserted into passage 125 of ferrule 120. Terminus 109 abuts with terminus 126 to form an optical butt-coupling 132 of optical fiber 108 with optical fiber 124. As optical fibers 108 and 124 are pushed together, air gap 106C is compressed and lens 106B moves towards lens 106A, thereby mating housing members 103 and 122 at interface 130. Optical fiber 104 of ferrule 102 is optically coupled with optical fiber 124 of ferrule 120 via optical fiber 108 and expanded-beam coupling 106.

Figure 2A:
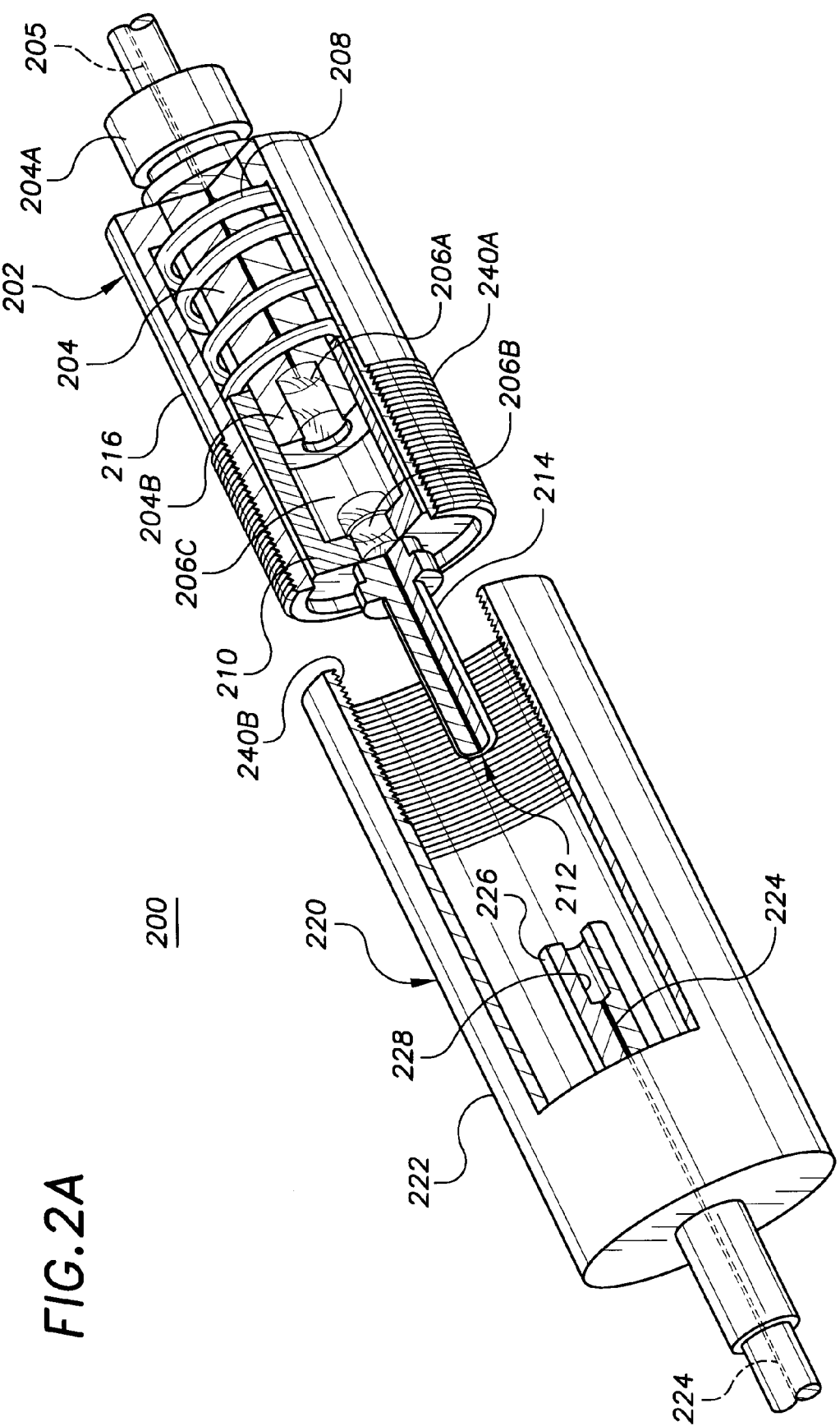
FIG. 2A is a diagram of an unmated optical fiber connector arrangement made in accordance with another embodiment of the present invention.

FIG. 2A is a cut-away view of an unmated optical fiber connector arrangement 200 made in accordance with another embodiment of the present invention. Connector arrangement 200 includes a ferrule 202 having a cylindrical member 204 with a back end 204A coupled to an optical fiber cable having an optical fiber 205 therein. A front end 204B of cylindrical member 204 supports a lens 206A coupled to optical fiber 205. Ferrule 202 further includes a spring member 208 disposed about cylindrical member 204. A plunger member 210 is also disposed about cylindrical member 204 and is adapted to engage the spring member 208. Plunger member 210 supports therein a lens 206B coupled to an optical fiber 212. Lens 206B is in optical alignment with lens 206A and forms an expanded-beam arrangement 206. Expanded beam arrangement 206 includes a gap 206C where the expanded light beam travels from one lens to the other.

A first terminus element 214 supports optical fiber 212 partially within ferrule 202. The first terminus element protrudes from and is supported by plunger member 210. Ferrule 202 further includes a housing member 216 that supports cylindrical member 204, spring member 208 and plunger member 210. When a pressure force is applied to terminus 214, housing member 216 facilitates the movement of the plunger member over the cylindrical member and against the spring member. The pressure force is applied when another ferrule is mated with ferrule 202.

Connector arrangement 200 also includes a ferrule 220 that is arranged to receive ferrule 202. Ferrule 220 includes a sleeve portion 222 cylindrically shaped to receive housing member 216 of ferrule 202. Sleeve portion 222 is coupled to an optical fiber cable, having an optical fiber 224 therein, and to a terminus element 226. Terminus element 226 encases optical fiber 224 and is supported within sleeve portion 222. Terminus element 226 is cylindrically shaped and has a recessed portion for receiving terminus element 214 having optical fiber 212. As ferrule 202 is engaged with ferrule 220, sleeve portion 222 slides over housing member 216 while terminus element 214 moves laterally within a channel 228 of terminus element 226. Once the termini from both ferrules are totally engaged, an optical butt coupling between optical fibers 212 and 224 is formed. The optical faces of both fibers now abut one another.

Figure 2B:
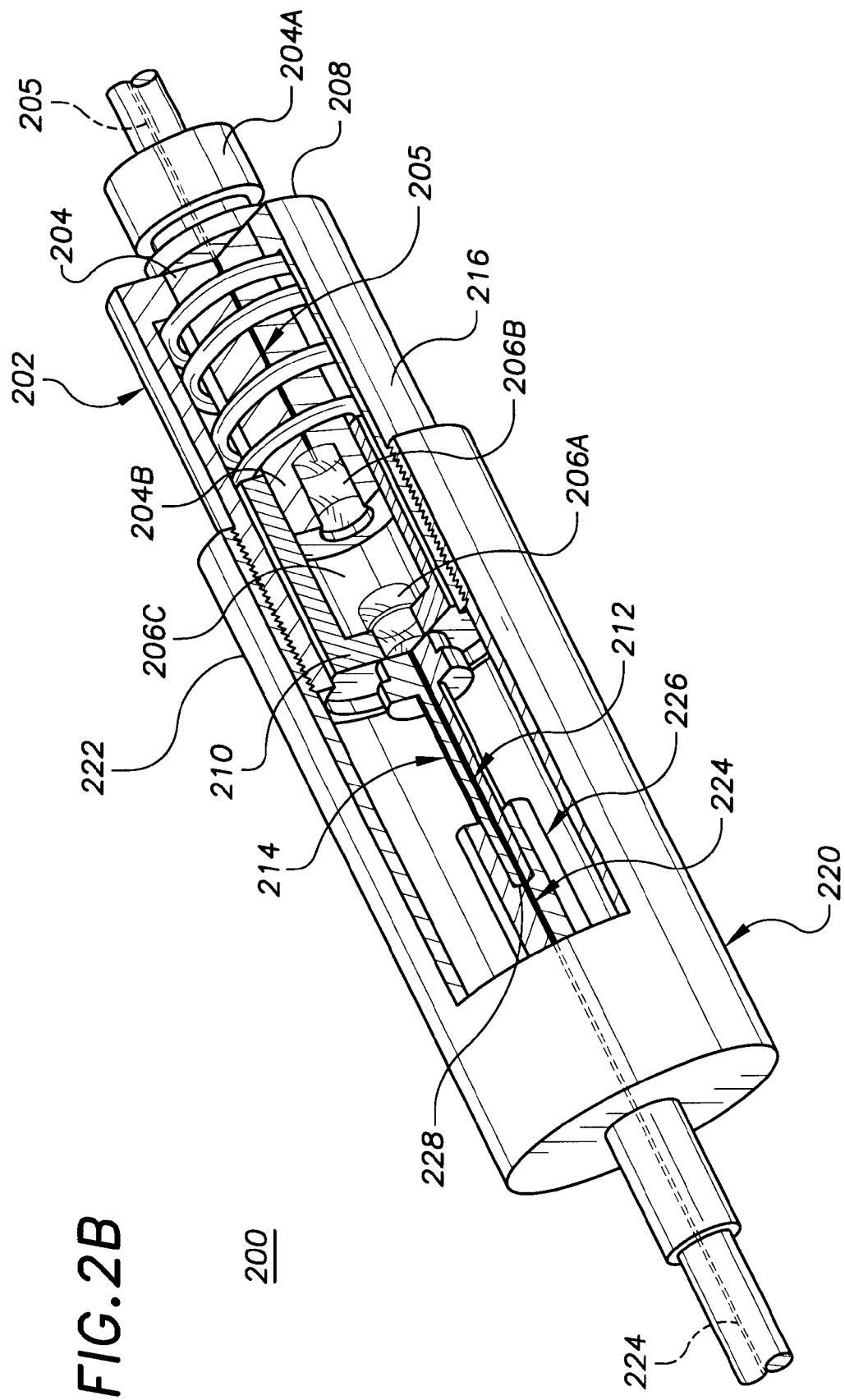
FIG. 2B is a diagram of a mated optical fiber connector arrangement made in accordance with another embodiment of the present invention.

FIG. 2B is a cut away view of a mated optical fiber connector arrangement 200 made in accordance with another embodiment of the present invention. When ferrules 202 and 220 are fully engaged, a butt-coupling interface 230 is formed between optical fibers 212 and 224 at the point where terminus elements 214 and 226 make contact. Optical fiber 205 is now coupled to optical fiber 224 via optical fiber 212 and expanded-beam arrangement 206. A pressure force is applied back against terminus element 214 and plunger member 210 as sleeve portion 222 of ferrule 220 moves over housing member 216 of ferrule 202. Plunger member 210 then applies a force against spring member 208 as plunger member 210 slides back over cylindrical member 204. As plunger member 210 slides back, air gap 206C of expanded-beam arrangement 206 is partially compressed. Spring member 208 then exerts a forward force on plunger member 210 that in turn forces terminus element 214 to abut with terminus element 226. Spring member 208 helps to ensure the integrity of the butt-coupling connection between optical fiber 212 and 224 by applying constant forward pressure on plunger member 210.

In one embodiment, the housings of ferrules 202 and 220 include complementary threads 240A and 240B to lock the ferrules together. In another embodiment, the ferrules are manufactured separately with an optical cable and can be mounted in a backplane arrangement. In another embodiment, a transceiver is included in connector arrangement 200.

The present invention provides an advantage eliminating a moving optical fiber pigtail that requires the use of a spring in the ferrule channel to move the entire cable within the ferrule. The connector arrangement of the present invention facilitates the fiber optic cable connection without having either cable moving within their respective ferrules. The connector arrangement of the present invention improves reliability and optical performance of the optical connection, simplifies repeatability of multiple connections, facilitates cleaning and maintenance and reduces manufacturing costs.

The present invention is believed to be applicable to a variety of applications involving optical fiber connection assemblies. Other aspects and embodiments of the present invention beyond those specifically described herein will be apparent to those skilled in the art from consideration of the specification and practice of the invention disclosed herein. It is intended that the specification and illustrated embodiments be considered as examples only, with a true scope and spirit of the invention being indicated by the following claims.

What is claimed is:

1. An optical fiber connector arrangement comprising:
   a first ferrule having an expanded-beam coupling arrangement disposed therein, the expanded-beam arrangement including a first lens coupled to a first optical fiber and a second lens coupled to a second optical fiber, the second optical fiber protruding from the first ferrule; and
   a second ferrule arranged to receive the first ferrule, the second ferrule supporting a third optical fiber and shaped to receive a portion of the first ferrule, whereby the second optical fiber is butt-coupled to the third optical fiber within the second ferrule when the second ferrule is engaged with the first ferrule.

2. The arrangement of claim 1, wherein the first lens and the second lens in the expanded-beam arrangement are separated by a gap, and the first ferrule includes means therein for supporting the second lens and permitting movement of the second lens within first ferrule upon application of force to the second fiber while maintaining an optical coupling within the expanded beam arrangement.

3. The arrangement of claim 1, wherein the first ferrule is further comprised of:
   a cylindrical member encasing the first optical fiber and having a front end supporting the first lens that is coupled to the first optical fiber;
   a spring member encasing the cylindrical member;
   a plunger member encasing a portion of the cylindrical member and adapted to be engaged by the spring member, the plunger member supporting therein the second lens that is coupled to the second optical fiber, wherein the second lens is in optical alignment with the first lens, and the second optical fiber is supported in a first terminus element protruding from and supported by the plunger member; and
   a housing member that encases the cylindrical member, spring member and plunger member and permits movement of the cylindrical member over the plunger member and against the spring member upon application of a force to the first terminus.

4. The arrangement of claim 3 wherein the second ferrule is further comprised of:

a sleeve portion shaped to receive the housing member; and a second terminus element supported by the sleeve portion, the second terminus element encasing the third optical fiber and shaped to receive the first terminus element, whereby the second and third optical fibers are butt coupled when the first and second ferrules are mated.

5. The arrangement of claim 2, wherein the second fiber is encased in a first terminus clement that protrudes from the first ferrule and the third fiber is encased in a second terminus clement that is within the second ferrule and is shaped to receive the first terminus clement.

6. The arrangement of claim 4, wherein the housing member and the sleeve portion include means for securing the first ferrule with the second ferrule upon mating the ferrules.

7. The arrangement of claim 1, wherein the first and second lens comprise a set of self-focusing lenses.

8. An optical fiber connector assembly comprising:
   a ferrule including,
      a cylindrical member encasing a first optical fiber and having a front end supporting a first lens that is coupled to the first optical fiber;
      a spring member encasing the cylindrical member;
      a plunger member encasing a portion of the cylindrical member and adapted to be engaged by the spring member, the plunger member supporting therein a second lens that is coupled to a second optical fiber, wherein the second lens is in optical alignment with the first lens, thereby forming an expanded-beam coupling arrangement within the first ferrule, and the second optical fiber is supported in a first terminus element protruding from and supported by the plunger member; and
      a housing member that encases the cylindrical member, spring member and plunger member and permits movement of the cylindrical member over the plunger member and against the spring member upon application of a force to the first terminus element.

9. A fiber optic cable assembly comprising:
   a first optical fiber; and
   a unitary ferrule having an expanded-beam coupling arrangement disposed therein, the expanded-bean arrangement including a first lens that is coupled to the first optical fiber and a second lens that is coupled to a second optical fiber, wherein the second optical fiber is protruding from the ferrule, wherein the first optical fiber and the first lens are rigidly mounted within the ferrule, and the first and the second lens are separated by a gap and the ferrule further comprises means for supporting the second lens and permitting movement of the second lens within the ferrule upon application of force to the second fiber while maintaining an optical coupling within the expanded-beam arrangement.

10. The assembly of claim 9, wherein the second fiber is encased in a terminus element that is coupled to the supporting means and protrudes from the ferrule.

11. An optical fiber connector arrangement comprising:
   a first ferrule including,
      a cylindrical member encasing a first optical fiber and having a front end supporting a first lens that is coupled to the first optical fiber;
      a spring member encasing the cylindrical member;
      a plunger member encasing a portion of the cylindrical member and engaged by the spring member, the plunger member supporting therein a second lens that is coupled to a second optical fiber, wherein the second lens is in optical alignment with the first lens, thereby forming an expanded-beam optical coupling within the first ferrule, and the second optical fiber is supported in a first terminus element protruding from and supported by the plunger member; and
      a housing member that encases the cylindrical member, spring member and plunger member and permits movement of the cylindrical member over the plunger member and against the spring member upon application of a force to the first terminus element; and
   a second ferrule arranged to receive a portion of the first ferrule, the second ferrule including a sleeve portion shaped to receive the housing member and a second terminus element supported by the sleeve portion, the second terminus element encasing a third optical fiber and shaped to receive the first terminus element, whereby the second and third optical fibers are butt-coupled when the first and second ferrules are mated.

12. The arrangement of claim 11, wherein the housing member and the sleeve portion further comprise means for securing the first ferrule with the second ferrule upon mating the ferrules.

13. An optical fiber connector comprising:
   first and second ferrules each having outer and inner ends, and each arranged to house components therein;
   wherein said components in said first ferrule comprise,
      a first terminus element having a first inner surface, and
      a first optical fiber encased in said first terminus clement, a first end of said first optical fiber adjacent said first inner surface and a second end of said first optical fiber running through said first terminus clement and extending out of said outer end of said first ferrule; and
   wherein said components in said second ferrule comprise,
      a support member having a second inner surface,
      a second optical fiber encased in said support element, a terminating end of said second optical fiber terminating at said second inner surface and a second end of said second optical fiber running through said support member and extending out of said outer end of said second ferrule,
      a first beam-expanding lens adjacent said terminating end of said second optical fiber,
      a second terminus element having third and fourth inner surfaces, wherein when said first and second ferrules are coupled together, said third inner surface mates with said first inner surface, and said fourth inner surface is located intermediate said second and third inner surfaces,
      a third optical fiber encased in said second terminus element, having a first end of said third optical fiber that terminates at said third inner surface, and having a second end running through said second terminus element and terminating adjacent said fourth inner surface,
      a second beam-expanding lens aligned with said first beam-expanding lens and located adjacent said terminating end of said third optical fiber at said fourth inner surface with a gap between said first and second beam-expanding lenses, and
      an end member that closes off said inner end of said second ferrule and supports said second beam-expanding lens.

14. An optical fiber connector as claimed in claim 13, wherein said first and second ferrules are cylindrical in shape and said inner ends of said first and second ferrules are provided with matching threads and when said ferrules are thread-coupled together said third inner surface mates with said first inner surface.

15. An optical fiber connector as claimed in claim 14, wherein said second ferrule further comprises a spring in said second ferrule located between said outer end of said second ferrule and said end member, wherein said end member is cylindrical in shape, is moveable in said second ferrule, is secured to said second beam-expanding lens and when said first and second ferrules are thread-coupled together said spring operates to firmly mate said first and third inner surfaces together.

16. An optical connector element comprising:
   a ferrule having a outer end and an inner end and components positioned in said ferrule wherein said components comprise;
   a support member having a first inner surface,
   a first optical fiber encased in said support element, one end of said first optical fiber terminating at said first inner surface and the other end of said first optical fiber, which runs through said support member, extending out of said outer end of said ferrule,
   a first beam-expanding lens adjacent said terminating end of said first optical fiber,
   a second terminus element having a third inner surface that is located intermediate said first and second inner surfaces.
   a second optical fiber encased in said second terminus element having a first end of said second optical fiber which terminates at said second inner surface and a second end of said second optical fiber, which runs through said second terminus element, which terminates adjacent said third inner surface,
   a second beam-expanding lens aligned with said first beam-expanding lens located adjacent said terminating end of said second optical fiber at said at said third inner surface and so as to form a gap between said first and second beam-expanding lenses, and
   an end member that closes off said inner end of said ferrule and supports said second beam-expanding lens.

17. An optical fiber coupling element comprising,
   an elongated ferrule having an outer and an inner end;
   a first optical fiber that extends from said outer ferrule end to a terminating end of said first optical fiber at a first side of a gap inside of said ferrule;
   a second optical fiber that extends from a terminating end of said second optical fiber at a second side of said gap to the outside of said ferrule at said inner ferrule end;
   a first beam-expanding lens adjacent said terminating end of said first optical fiber;
   a second beam-expanding lens adjacent said terminating end of said second optical fiber and aligned with said first beam-expanding lens; and
   an end member that closes off said inner end and supports said second beam-forming lens.

18. An optical fiber connector element as claimed in claim 17, wherein the ferrule and said end member are cylindrical in shape.

19. An optical fiber connector arrangement comprising:
   a unitary first ferrule having an expanded-beam coupling arrangement disposed therein, the expanded-beam arrangement including a first lens coupled to a first optical fiber and a second lens coupled to a second-optical fiber, the second optical fiber protruding from the first ferrule; and
   a unitary second ferrule arranged to receive the first ferrule, the second ferrule supporting a third optical fiber and shaped to receive a portion of the first ferrule, whereby the second optical fiber is butt-coupled to the third optical fiber within the second Ferrule when the second ferrule is engaged with the first ferrule.

* * * * *